United States Patent
Yamamoto et al.

(10) Patent No.: US 10,867,632 B2
(45) Date of Patent: Dec. 15, 2020

(54) SHINGLED MAGNETIC RECORDING DEVICE CAPABLE OF RECORDING POSITION ERROR ON NON-VOLATILE MEMORY

(71) Applicants: Kabushiki Kaisha Toshiba, Tokyo (JP); Toshiba Electronic Devices & Storage Corporation, Tokyo (JP)

(72) Inventors: Yu Yamamoto, Tokyo (JP); Makoto Asakura, Tokyo (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/569,210

(22) Filed: Sep. 12, 2019

(65) Prior Publication Data
US 2020/0294547 A1    Sep. 17, 2020

(30) Foreign Application Priority Data
Mar. 15, 2019    (JP) .................. 2019-048725

(51) Int. Cl.
| G11B 20/10 | (2006.01) |
| G11B 5/012 | (2006.01) |
| G11B 5/596 | (2006.01) |
| G11B 20/18 | (2006.01) |
| G11B 19/04 | (2006.01) |
| G11B 5/54 | (2006.01) |

(52) U.S. Cl.
CPC ........ *G11B 20/10388* (2013.01); *G11B 5/012* (2013.01); *G11B 5/54* (2013.01); *G11B 5/596* (2013.01); *G11B 5/59627* (2013.01); *G11B 5/59638* (2013.01); *G11B 5/59688* (2013.01); *G11B 19/044* (2013.01); *G11B 19/045* (2013.01); *G11B 20/18* (2013.01)

(58) Field of Classification Search
None
See application file for complete search history.

(56) References Cited

U.S. PATENT DOCUMENTS

| 8,947,818 | B2 | 2/2015 | Nitta et al. | |
| 9,240,198 | B1 * | 1/2016 | Hara | G11B 5/012 |
| 9,495,988 | B1 * | 11/2016 | Liu | G11B 20/10009 |
| 10,366,717 | B1 * | 7/2019 | Kudo | G11B 19/045 |
| 10,540,999 | B1 * | 1/2020 | Kawabe | G11B 5/012 |
| 10,629,235 | B2 * | 4/2020 | Kawabe | G11B 20/1217 |
| 2012/0307400 | A1 | 12/2012 | Kawabe | |
| 2014/0029126 | A1 * | 1/2014 | Nitta | G11B 20/18 360/31 |
| 2014/0118857 | A1 * | 5/2014 | Kashiwagi | G11B 19/045 360/75 |

(Continued)

FOREIGN PATENT DOCUMENTS

| JP | 2012-252732 A | 12/2012 |
| JP | 5787839 B2 | 9/2015 |

*Primary Examiner* — Tan X Dinh
(74) *Attorney, Agent, or Firm* — White & Case LLP

(57) ABSTRACT

According to one embodiment, a magnetic disk device includes a disk, a head that writes data to the disk and reads data from the disk, and a controller that overwrites a second track on a first track in a first track group, and records a maximum first positioning error in a first direction from the first track to the second track in the first track in a nonvolatile first recording area.

16 Claims, 12 Drawing Sheets

(56) References Cited

U.S. PATENT DOCUMENTS

| | | | |
|---|---|---|---|
| 2014/0153131 A1* | 6/2014 | Matsuzawa | G11B 5/5547 |
| | | | 360/78.14 |
| 2016/0171996 A1* | 6/2016 | Lee | G11B 5/59627 |
| | | | 360/77.07 |
| 2017/0186455 A1* | 6/2017 | Hara | G11B 5/012 |
| 2017/0200470 A1* | 7/2017 | Kojima | G11B 5/5547 |
| 2017/0229141 A1 | 8/2017 | Ide et al. | |
| 2018/0197567 A1* | 7/2018 | Kawabe | G11B 5/59627 |
| 2018/0210668 A1 | 7/2018 | Hassner et al. | |
| 2019/0362752 A1* | 11/2019 | Kawabe | G11B 20/1217 |
| 2019/0378543 A1* | 12/2019 | Maeto | G11B 5/012 |
| 2020/0090700 A1* | 3/2020 | Kawabe | G11B 5/012 |

* cited by examiner

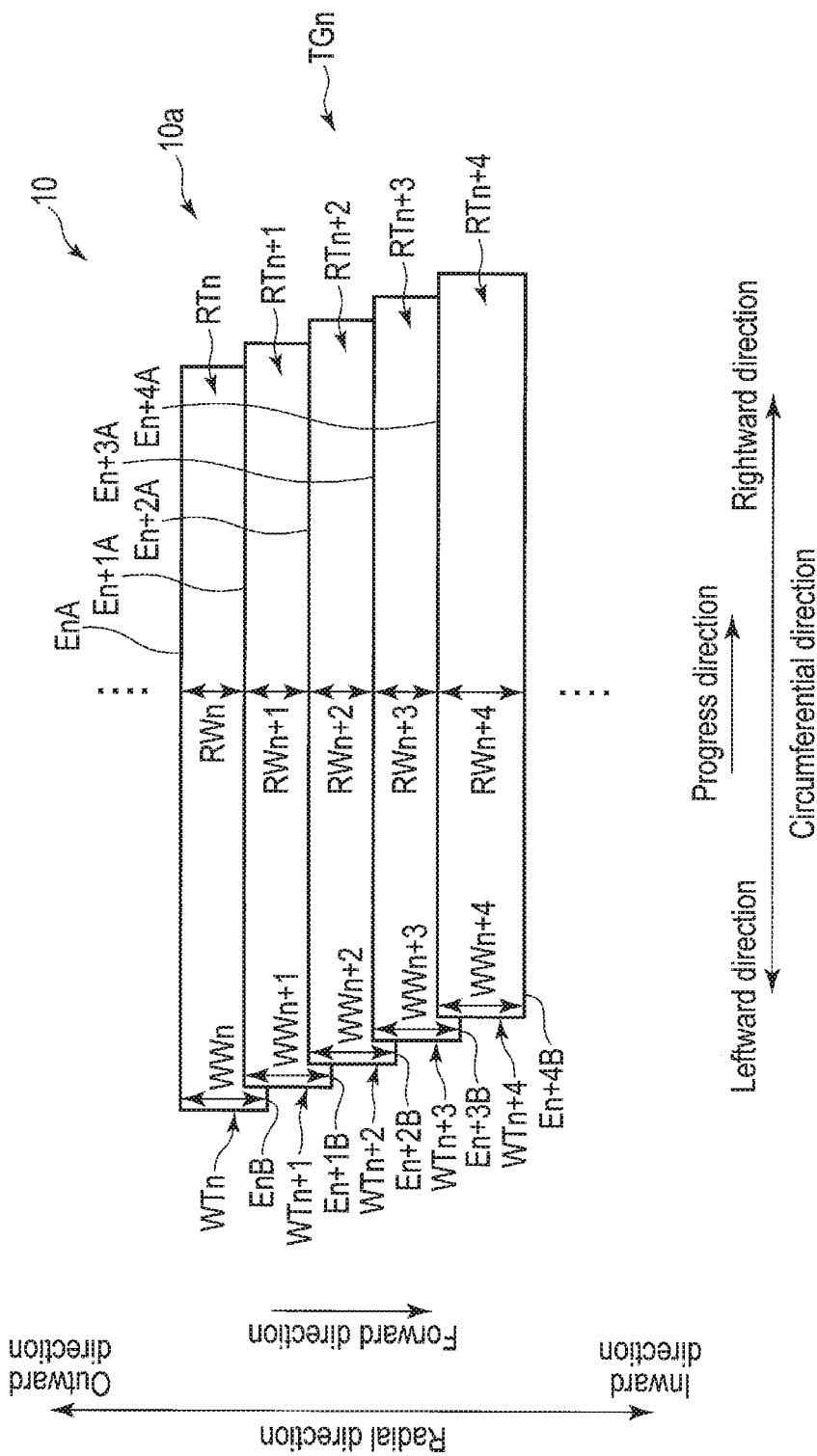
F I G. 2

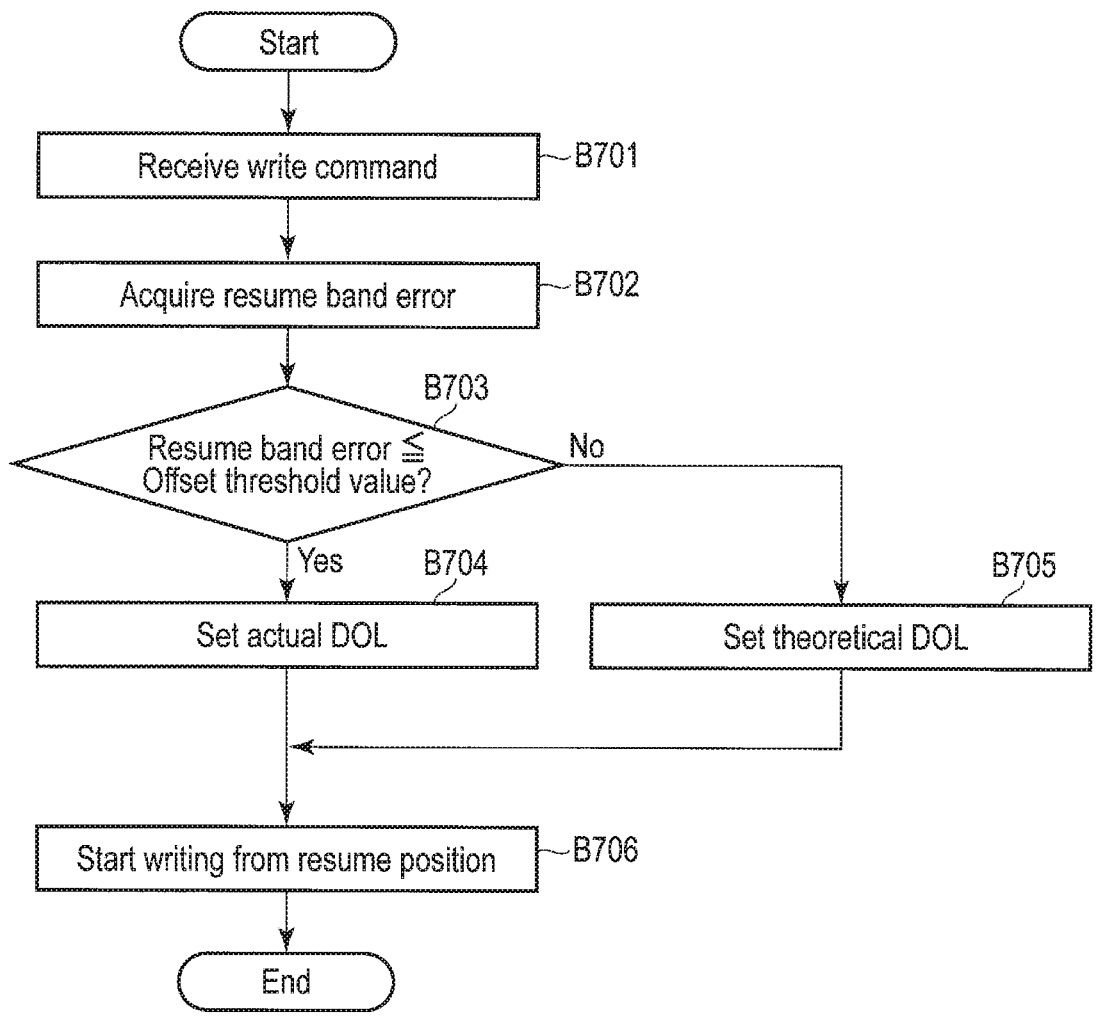
F I G. 7

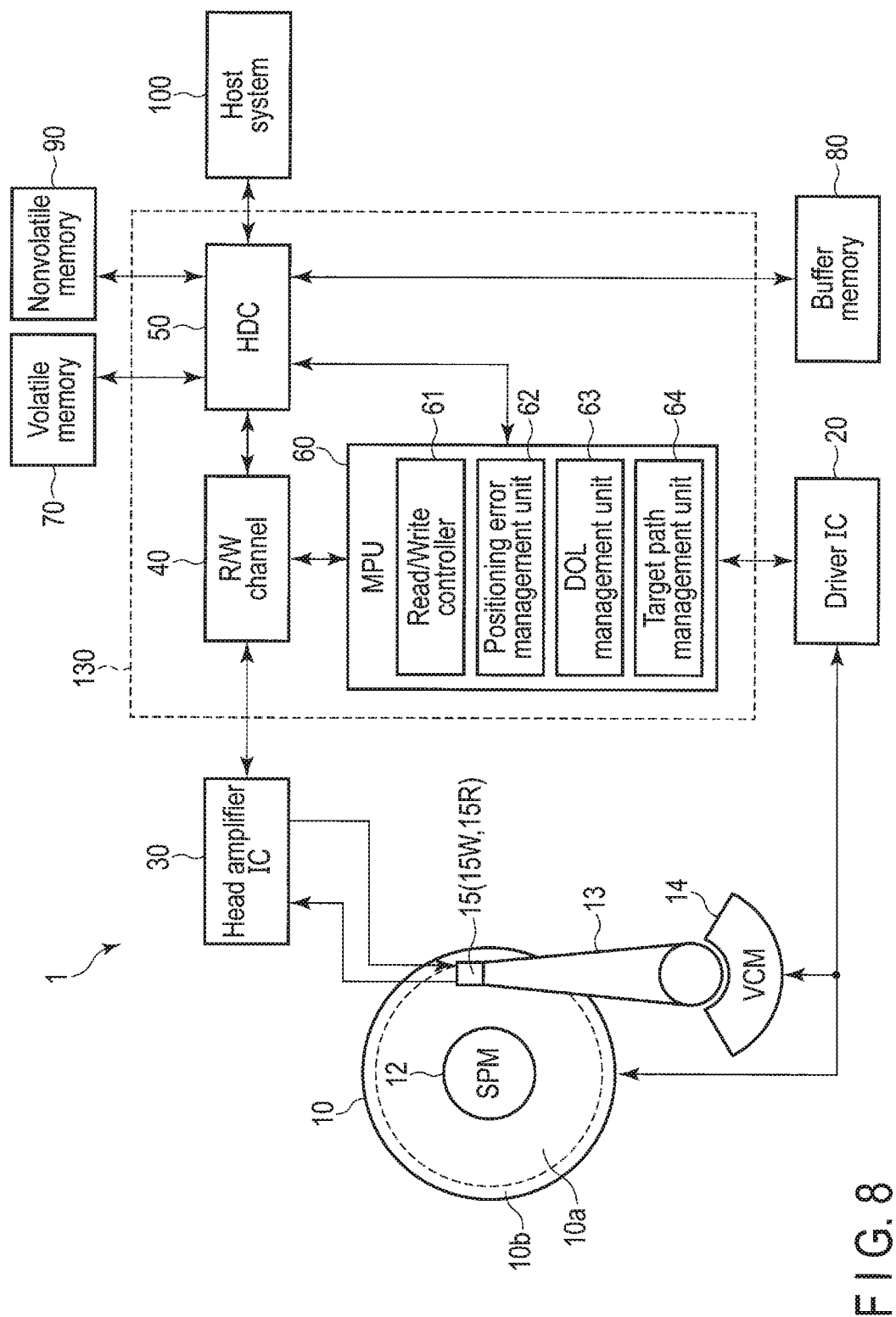
F I G. 8

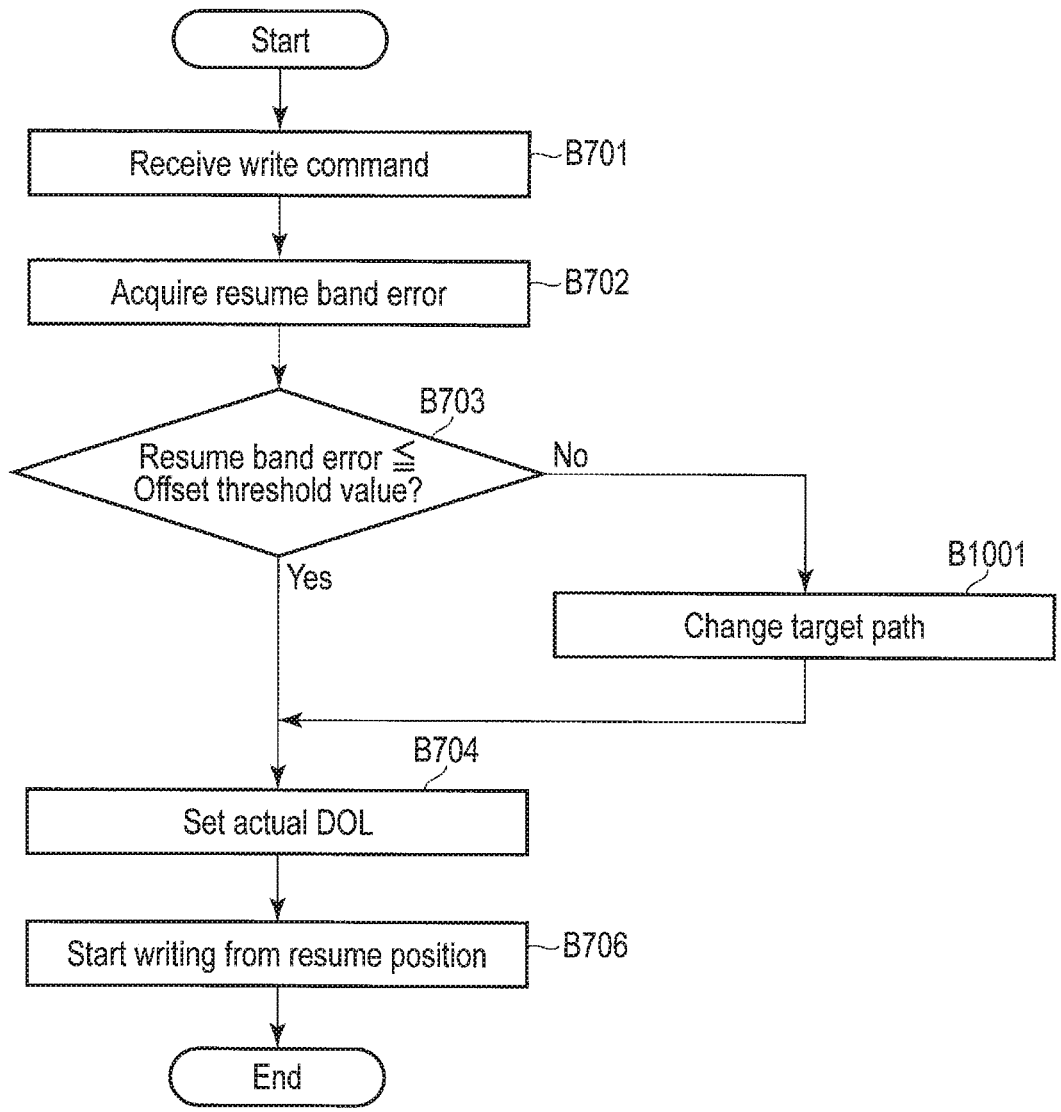
F I G. 10

US 10,867,632 B2

SHINGLED MAGNETIC RECORDING DEVICE CAPABLE OF RECORDING POSITION ERROR ON NON-VOLATILE MEMORY

CROSS-REFERENCE TO RELATED APPLICATIONS

This application is based upon and claims the benefit of priority from Japanese Patent Application No. 2019-048725, filed Mar. 15, 2019, the entire contents of which are incorporated herein by reference.

FIELD

Embodiments described herein relate generally to a magnetic disk device and a write processing method.

BACKGROUND

In recent years, various techniques for realizing high recording capacity of magnetic disk devices have been developed. One of these techniques is a recording technique called shingled write magnetic recording (SMR) or shingled write recording (SWR). When writing data to a magnetic disk, a shingled recording type magnetic disk device writes a next recording track overlapping a part of an adjacent track (hereinafter referred to as an adjacent track). In the shingled recording type magnetic disk device, a track pitch may be narrow as compared with a normal recording method in which an overwrite is not performed.

BRIEF DESCRIPTION OF THE DRAWINGS

FIG. 2 is a schematic diagram illustrating an example of a shingled magnetic recording area in which data is written.

FIG. 7 is a flowchart illustrating an example of a write processing method according to the first embodiment.

FIG. 8 is a block diagram illustrating a configuration of a magnetic disk device according to a second embodiment.

FIG. 10 is a flowchart illustrating an example of a write processing method according to the second embodiment.

DETAILED DESCRIPTION

In general, according to one embodiment, a magnetic disk device comprises: a disk; a head that writes data to the disk and reads data from the disk; and a controller that overwrites a second track on a first track in a first track group, and records a maximum first positioning error in a first direction from the first track to the second track in the first track in a nonvolatile first recording area.

Hereinafter, embodiments will be described with reference to the drawings. Note that the drawings are merely examples and do not limit the scope of the invention.

First Embodiment

Figure 1:
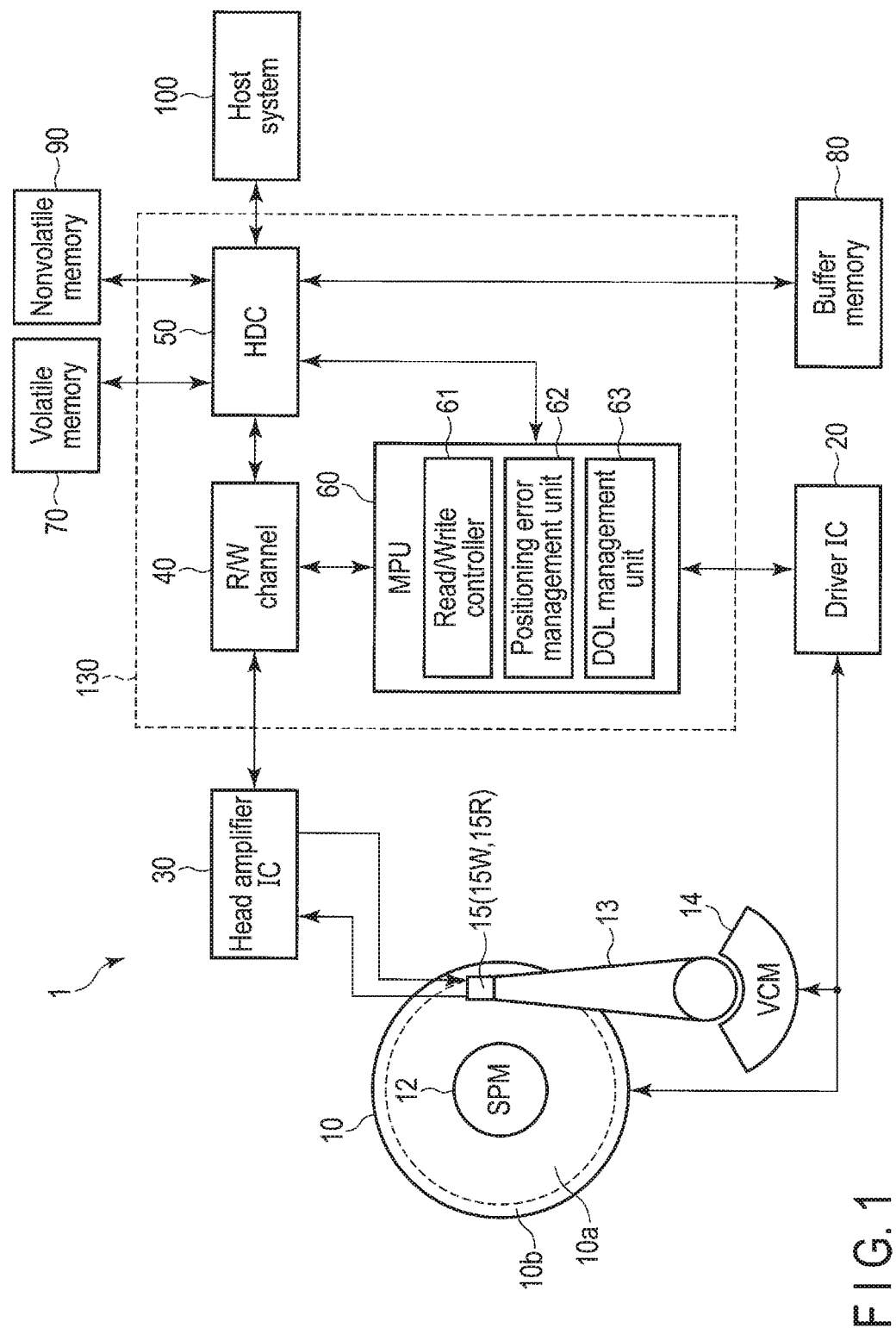
FIG. 1 is a block diagram illustrating a configuration of a magnetic disk device according to a first embodiment.

FIG. 1 is a block diagram illustrating a configuration of a magnetic disk device 1 according to a first embodiment.

The magnetic disk device 1 includes a head disk assembly (HDA) to be described later, a driver IC 20, a head amplifier integrated circuit (hereinafter, head amplifier IC or preamplifier) 30, a volatile memory 70, a buffer memory (buffer) 80, a nonvolatile memory 90, and a system controller 130 that is a 1-channel integrated circuit. In addition, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12 and is rotated by the driving of the SPM 12. The arm 13 and the VCM 14 constitute an actuator. The actuator performs movement control such that the head 15 mounted on the arm 13 is moved to a particular position on the disk 10 by driving the VCM 14. The disk 10 and the head 15 may be provided in two or more numbers.

In the disk 10, a shingled magnetic recording (SMR) area 10a and a system area 10b are allocated to a data region. Hereinafter, the direction orthogonal to the radial direction of the disk 10 is referred to as a circumferential direction.

In the shingled magnetic recording area 10a, user data and the like requested to be written from the host 100 are recorded. The system area 10b stores information and the like necessary for system management. Note that the system area 10b may also be used as a media cache of the shingled magnetic recording area 10a. In the shingled magnetic recording area 10a, a track to be written next is overwritten on a part of the track that has been currently written. Therefore, a track density (track per inch: TPI) of the shingled magnetic recording area 10a is higher than a track density of the area in which data is written by a normal recording method which is not overwritten. In the shingled magnetic recording area 10a, a plurality of track groups each including a plurality of overwritten tracks are arranged at intervals (gaps).

In the following, the track group including the plurality of overwritten tracks is referred to as a band area. The band area includes at least one track in which radially adjacent tracks (hereinafter referred to as adjacent tracks) are partially overwritten, and a track (final track) on which data is finally overwritten. In the final track, other tracks are not partially overwritten. Thus, the radial width of the final track is wider than the radial width of the track on which other tracks are partially overwritten. In the following, the track written to the disk 10 is referred to as a write track. The area of the remaining write track except for the area on which the adjacent track is overwritten is referred to as a read track. In addition, the write track may be simply referred to as a track, the read track may be simply referred to as a track, and the write track and the read track may be collectively simply referred to as tracks. The track includes a plurality of sectors. The "track" is used as data extending in the circumferential direction of the disk 10, an area extending in the circumferential direction of the disk 10, a trajectory or a path (operation path) of the head 15, or other various meanings. The "sector" is used as a particular area of the track, for example, data written to the sector, a particular area of the track, and other various meanings. In addition, the radial width of the write track may be referred to as a write track width, and the radial width of the read track may be referred to as a read track width. The write track width may be simply referred to as the track width, the read track width may be simply referred to as the track width, and the write track width and the read track width may be collectively simply referred to as the track widths. The central position of the read track width may be referred to as a read track center, the central position of the write track width may be referred to as a write track center, and the write track center and the read track center may be collectively simply referred to as the track centers.

FIG. 2 is a schematic diagram illustrating an example of the shingled magnetic recording area 10a in which data is written. In FIG. 2, a vertical axis represents the radial direction of the disk 10, and a horizontal axis represents the circumferential direction of the disk 10. In the radial direction, the direction toward the center of the disk 10 is referred to as an inward direction (inward), and the direction opposite to the inward direction is referred to as an outward direction (outside). A particular position of the disk 10 in the radial direction may be referred to as a radial position, and a particular position of the disk 10 in the circumferential direction may be referred to as a circumferential position. The radial position corresponds to, for example, a track, and the circumferential position corresponds to, for example, a sector. In addition, in the radial direction, the direction in which data is written and read is referred to as a forward direction. In the example illustrated in FIG. 2, the forward direction is the same as the inward direction. Note that the forward direction may be the same as the outward direction. In the circumferential direction, one direction is set as a rightward direction, and the opposite direction to the rightward direction is set as a leftward direction. In addition, in the circumferential direction, the direction in which data is written and read is referred to as a progress direction. For example, the progress direction is opposite to the rotation direction of the disk 10. In the example illustrated in FIG. 2, the progress direction is the same as the rightward direction. Note that the progress direction may be the same as the leftward direction.

In the example illustrated in FIG. 2, the shingled magnetic recording area 10a includes a band area TGn. In FIG. 2, each track in the band area TGn extends linearly for convenience of description. In practice, each track in the band area TGn is in the form of a concentric circle curved along the shape of the disk 10. That is, in practice, the end portion in the leftward direction of each track and the end portion in the rightward direction of each track in the band area TGn coincide with each other. In addition, each track in the band area TGn actually causes a deviation or the like due to the influence of disturbance or other structures. Note that the shingled magnetic recording area 10a may include two or more band areas.

In the example illustrated in FIG. 2, the band area TGn includes write tracks WTn, WTn+1, WTn+2, WTn+3, and WTn+4. The write tracks WTn and WTn+1 partially overlap each other. The write tracks WTn+1 and WTn+2 partially overlap each other. The write tracks WTn+2 and WTn+3 partially overlap each other. The write tracks WTn+3 and WTn+4 partially overlap each other. In the band area TGn, the write tracks WTn to WTn+4 are overwritten in this order in the radial direction. Note that although the band area TGn includes five tracks, the band area TGn may include less than five tracks, or may include more than five tracks.

The write track WTn has a track edge EnA and a track edge EnB. In the example illustrated in FIG. 2, the track edge EnA is the end portion in the outward direction of the write track WTn, and the track edge EnB is the end portion in the inward direction (forward direction) of the write track WTn. The write track WTn+1 has a track edge En+1A and a track edge En+1B. In the example illustrated in FIG. 2, the track edge En+1A is the end portion in the outward direction of the write track WTn+1, and the track edge En+1B is the end portion in the inward direction (forward direction) of the write track WTn+1. The write track WTn+2 has a track edge En+2A and a track edge En+2B. In the example illustrated in FIG. 2, the track edge En+2A is the end portion in the outward direction of the write track WTn+2, and the track edge En+2B is the end portion in the inward direction (forward direction) of the write track WTn+2. The write track WTn+3 has a track edge En+3A and a track edge En+3B. In the example illustrated in FIG. 2, the track edge En+3A is the end portion in the outward direction of the write track WTn+3, and the track edge En+3B is the end portion in the inward direction ID (forward direction) of the write track WTn+3. The write track (final track) WTn+4 has a track edge En+4A and a track edge En+4B. In the example illustrated in FIG. 2, the track edge En+4A is the end portion in the outward direction of the write track WTn+4, and the track edge En+4B is the end portion in the inward direction (forward direction) of the write track WTn+4.

The write track width WWn of the write track WTn is the radial length between the track edges EnA and EnB. The write track width WWn+1 of the write track WTn+1 is the radial length between the track edges En+1A and En+1B. The write track width WWn+2 of the write track WTn+2 is the radial length between the track edges En+2A and En+2B. The write track width WWn+3 of the write track WTn+3 is the radial length between the track edges En+3A and En+3B. The write track width WWn+4 of the write track WTn+4 is the radial length between the track edges En+4A and En+4B. The write track widths WWn to WWn+4 are, for example, equal to each other. Note that the write track widths WWn to WWn+4 may be different from each other.

The read track RTn is the remaining area except for a part of the write track WTn on which the write track WTn+1 is overwritten. The read track RTn+1 is the remaining area except for a part of the write track WTn+1 on which the write track WTn+2 is overwritten.

The read track RTn+2 is the remaining area except for a part of the write track WTn+2 on which the write track WTn+3 is overwritten. The read track RTn+3 is the remaining area except for a part of the write track WTn+3 on which the write track WTn+4 is overwritten. The read track RTn+4 corresponds to the write track WTn+4. The read track RTn+4 corresponds to the final track in the band area TGn.

The read track width RWn of the read track RTn is the radial length between the track edges EnA and En+1A. The read track width RWn+1 of the read track RTn+1 is the radial length between the track edges En+1A and En+2A. The read track width RWn+2 of the read track RTn+2 is the radial length between the track edges En+2A and En+3A. The read track width RWn+3 of the read track RTn+3 is the radial length between the track edges En+3A and En+4A. The read track width RWn+4 of the read track RTn+4 is the radial length between the track edges En+4A and En+4B. That is, the read track width RWn+4 is equal to the write track width WWn+4.

The head 15 includes a slider as a main body, and includes a write head 15W and a read head 15R that are mounted on the slider. The write head 15W writes data to the disk 10. The read head 15R reads data recorded on the disk 10. Note that the write head 15W may be simply referred to as the head 15, the read head 15R may be simply referred to as the head 15, and the write head 15W and the read head 15R may be collectively referred to as the head 15.

The driver IC 20 controls the driving of the SPM 12 and the VCM 14 according to the control of the system controller 130 (specifically, the MPU 60 described later). Note that the driver IC 20 may include a power loss protection (PLP) power supply (auxiliary power supply) that is a backup power supply.

When power supplied from the power supply of the magnetic disk device 1 (hereinafter simply referred to as the power supply) is interrupted or power supplied from the power supply is reduced, the PLP power supply supplies power necessary to maintain the minimum operation of the magnetic disk device 1. The function to save, to the nonvolatile memory or the like, data cached in the volatile memory or the like and not yet written to disk 10 by the power supplied from the PLP power supply may be referred to as a PLP function.

The head amplifier IC (preamplifier) 30 includes a read amplifier and a write driver. The read amplifier amplifies a read signal read from the disk 10 and outputs the amplified read signal to the system controller 130 (specifically, the read/write (R/W) channel 40 described later). The write driver outputs, to the head 15, a write current corresponding to a signal output from the R/W channel 40.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like transmitted and received between the magnetic disk device 1 and the host 100. Note that the buffer memory 80 may be integrated with the volatile memory 70. The buffer memory 80 is, for example, a DRAM, a static random access memory (SRAM), an SDRAM, a ferroelectric random access memory (FeRAM), and a magnetoresistive random access memory (MRAM).

The nonvolatile memory 90 is a semiconductor memory that records stored data even when power supply is cut off. The nonvolatile memory 90 is, for example, a NOR type or NAND type flash read only memory (FROM).

The system controller (controller) 130 is realized by, for example, using a large scale integrated circuit (LSI) called a system-on-a-chip (SoC) in which a plurality of elements are integrated on a single chip.

The system controller 130 includes a read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the buffer memory 80, the nonvolatile memory 90, the host system 100, and the like.

The R/W channel 40 performs signal processing of read data transferred from the disk 10 to the host 100 and write data transferred from the host 100 in response to an instruction from the MPU 60 described later. The R/W channel 40 has a circuit or function that measures the signal quality of the read data. The R/W channel 40 is electrically connected to, for example, the head amplifier IC 30, the HDC 50, and the MPU 60.

The HDC 50 controls data transfer between the host 100 and the R/W channel 40 in response to an instruction from the MPU 60 described later. The HDC 50 is electrically connected to, for example, the R/W channel 40, the MPU 60, the volatile memory 70, the buffer memory 80, and the nonvolatile memory 90.

The MPU 60 is a main controller that controls each unit of the magnetic disk device 1. The MPU 60 controls the VCM 14 through the driver IC 20 and performs servo control for positioning the head 15. The MPU 60 controls the operation of writing data to the disk 10 and selects the storage destination of the write data. In addition, the MPU 60 controls the operation of reading data from the disk 10 and controls the processing of read data. The MPU 60 is connected to each unit of the magnetic disk device 1. The MPU 60 is electrically connected to, for example, the driver IC 20, the R/W channel 40, and the HDC 50.

The MPU 60 includes a read/write controller 61, a positioning error management unit 62, and a drift-off level (DOL) management unit 63. The MPU 60 performs the processing of these units, such as the read/write controller 61, the positioning error management unit 62, and the DOL management unit 63, on firmware. Note that the MPU 60 may include these units, for example, the read/write controller 61, the positioning error management unit 62, and the DOL management unit 63, as circuits.

The read/write controller 61 controls data read processing and write processing according to a command from the host 100. The read/write controller 61 controls the VCM 14 through the driver IC 20, positions the head 15 at a particular position on the disk 10, and reads or writes data. For example, the read/write controller 61 positions the head 15 at a particular radial position (hereinafter referred to as a target position), writes data in a particular sector, or reads data from a particular sector. The read/write controller 61 positions the head 15 to each target position at each circumferential position and writes a particular track. Hereinafter, the path of the head 15 shown by connecting each target position at each circumferential position is referred to as a target path. The target path is set, for example, concentrically with the disk 10. When the shingled magnetic recording is performed, the read/write controller 61 sequentially writes data from the particular sector of the particular band area. When a particular band area is read, the read/write controller 61 sequentially reads data from the particular sector of the band area. In the following, "positioning or arranging the central portion of the head 15 (write head 15W or read head 15R) at the particular position" may be expressed as "positioning or arranging the head 15 (write head 15W or read head 15R) at the particular position". Note that the read/write controller 61 may write data by a normal recording method instead of the shingled magnetic recording method.

The read/write controller 61 controls the write processing based on an error (hereinafter referred to as a positioning error or a position error) between a target position and an actual radial position (hereinafter referred to as an actual position) of the head 15. For example, the read/write controller 61 sets a threshold value (hereinafter referred to as a drift-off level (DOL)) of a positioning error corresponding to a track to be currently written (hereinafter referred to as a current track), based on a positioning error (hereinafter referred to as a previous positioning error) corresponding to a track written one before (hereinafter referred to as a previous track), and writes the current track with the set DOL. When the positioning error corresponding to the current track (hereinafter referred to as the current positioning error) exceeds the DOL in writing the current track, the read/write controller 61 prohibits (or interrupts) the write processing, and writes data again from the circumferential position at which the write processing is interrupted (write retry). As such, the function to control the write processing based on the previous positioning error and the current positioning error may be referred to as a dynamic drift-off level (DDOL) function or simply DDOL.

Figure 3:
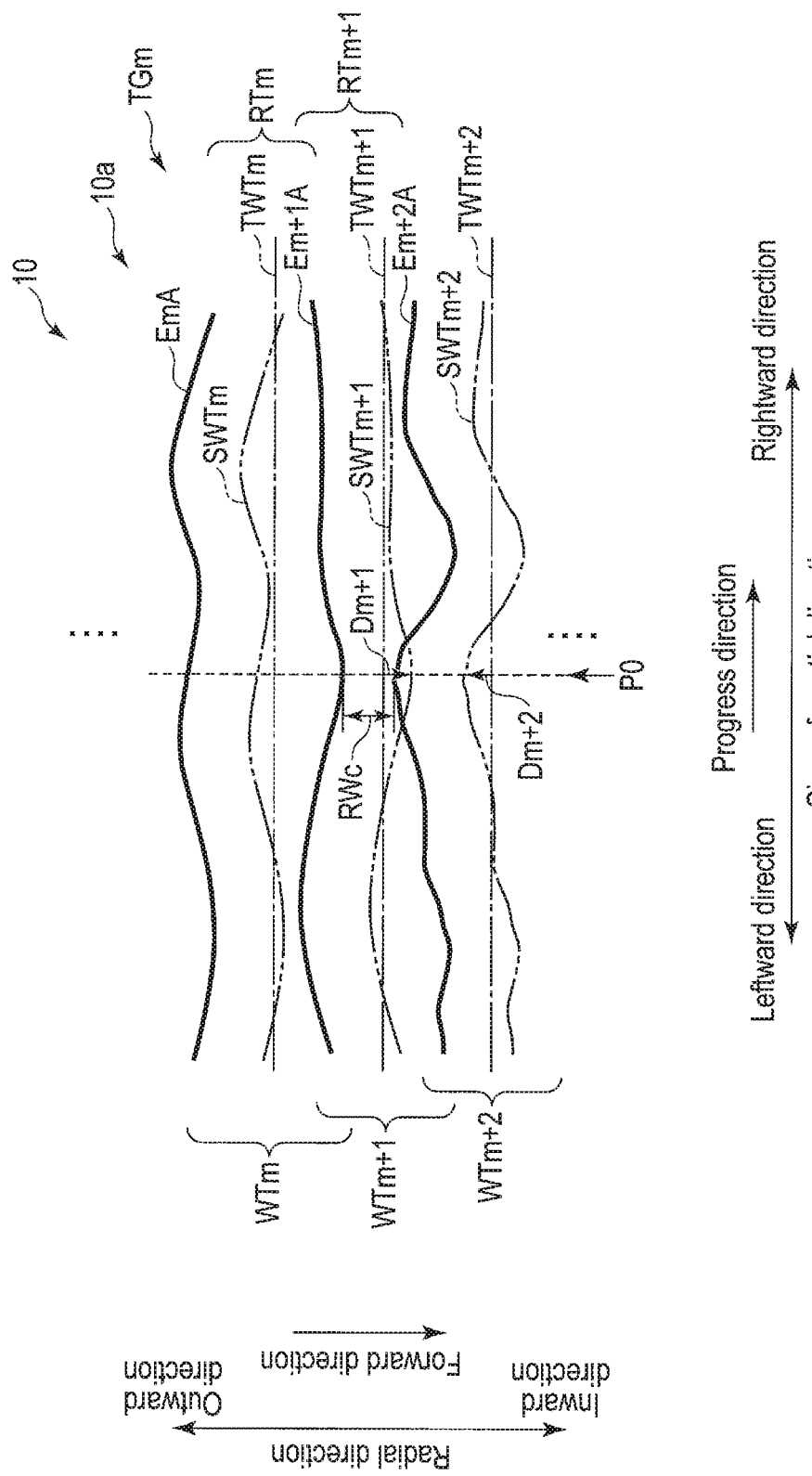
FIG. 3 is a schematic diagram illustrating an example of DDOL.

FIG. 3 is a schematic view illustrating an example of DDOL.

In the example illustrated in FIG. 3, the band area TGm indicates the write track WTm, the write track WTm+1, and the write track WTm+2. In the band area TGm, the write tracks WTm to WTm+2 are overwritten in this order in the forward direction. FIG. 3 illustrates a target path TWTm in the write track WTm and a path (hereinafter referred to as an actual path) SWTm of the head 15 indicated by each actual position in each circumferential position. The write track WTm is written by positioning the head 15 to the actual path SWTm. The write track WTm has a track edge EmA. The track edge EmA is the end portion in the outward direction of the write track WTm. FIG. 3 illustrates a target path TWTm+1 and an actual path SWTm+1 in the write track WTm+1. The write track WTm+1 is written by positioning the head 15 to the actual path SWTm+1. The write track WTm+1 has a track edge Em+1A. The track edge Em+1A is the end portion in the outward direction of the write track WTm+1. The read track RTm is disposed between the track edges EmA and Em+1A. FIG. 3 illustrates a target path TWTm+2 and an actual path SWTm+2 in the write track WTm+2. The write track WTm+2 is written by positioning the head 15 to the actual path SWTm+2. The write track WTm+2 has a track edge Em+2A. The track edge Em+2A is the end portion in the outward direction of the write track WTm+1. The read track RTm+1 is disposed between the track edges Em+1A and Em+2A. The read track width RWc is the radial length of the read track RTm+1 at the circumferential position P0. The read track width RWc is, for example, the lower limit value of the read track width capable of reading the read track RTm+1. In FIG. 3, the target paths TWTm, TWTm+2, and TWTm+2 are, for example, paths concentric with the disk 10.

The read/write controller 61 positions the head 15, for example, the write head 15W so as to follow the target path TWTm, and writes the write track WTm. In practice, when the write track WTm is written, the write head 15W travels on the actual path SWTm. Therefore, the read/write controller 61 writes the write track WTm based on the actual path SWTm.

The read/write controller 61 positions the write head 15W so as to follow the target path TWTm+1, and writes the write track WTm+1. In practice, when the write track WTm+1 is written, the write head 15W travels on the actual path SWTm+1. Therefore, the read/write controller 61 writes the write track WTm+1 based on the actual path SWTm+1. When the write track WTm+1 is written, the read/write controller 61 perform writing by deviating with positioning error Dm+1 in the forward direction at the circumferential position P0.

The read/write controller 61 positions the head 15, for example, the write head 15W so as to follow the target path TWTm+2, and writes the write track WTm+2. In practice, when the write track WTm+2 is written, the write head 15W travels on the actual path SWTm+2. Therefore, the read/ write controller 61 writes the write track WTm+2 based on the actual path SWTm+2. When the write track WTm+2 is written, the read/write controller 61 perform writing by deviating with positioning error Dm+2 in the direction (outward direction) opposite to the forward direction at the circumferential position P0. When it is determined that the positioning error Dm+2 exceeds the DOL at the circumferential position P0 of the write track WTm+2, the read/write controller 61 interrupts the write processing. In other words, when it is determined that the read track width RWc is smaller than the threshold value of the read track width, the read/write controller 61 interrupts (or prohibits) the write processing.

The positioning error management unit 62 manages the positioning error for each band area. The positioning error management unit 62, for example, assigns management numbers to some band areas in the entire band area of the disk 10 and manages the same in a table (hereinafter also referred to as a management table), and temporarily records, in a particular recording area, for example, a volatile recording area or the like, a maximum positioning error (hereinafter referred to as an DOL target error) in the forward direction on the track before the track to which current data is to be written (hereinafter also referred to as the write-target track) in each band area linked to each management number. In the following, the "maximum positioning error in the forward direction" may be simply referred to as the "maximum positioning error". The volatile recording area is, for example, the volatile memory 70 or the buffer memory 80. In the following, refers to "the band area managed by the management number", that is, "the band area managed by the management table" is referred to as "a management band area", "the band area not managed by the management number", that is, "the band area not managed by the management table" is referred to as "a non-management band area", and "the management band area" or "the non-management band area" is simply referred to as "band area". The management band area has a higher priority than the non-management band area, or corresponds to some band areas of all band areas instructed to perform write processing by a command from the host 100 or the like. That is, the management table manages, as the management band areas, some high priority band areas that perform write processing within all the band areas. When the management band area is excluded from the management by the management table and changed to the non-management band area, the positioning error management unit 62 links the DOL target error corresponding to the management band area excluded from the management by the management table to the management band area excluded from the management by the management table, and performs writing to the particular recording area, for example, the nonvolatile recording area. The nonvolatile recording area is, for example, the system area 10*b* and the nonvolatile memory 90. In the case in which the management band area is excluded from the management by the management table and changed to the non-management band area when interrupting the write processing on the particular track of the particular management band area and writing the particular track of another non-management band area, the positioning error management unit 62 links the DOL target error corresponding to the management band area excluded from the management by the management table to the management band area excluded from the management by the management table, and performs writing to the particular recording area, for example, the nonvolatile recording area. In addition, in the case of resuming the write processing from the particular circumferential position (hereinafter also referred to as a resume position) at which the write processing of the particular write target track (hereinafter also referred to as the resume track) of the non-management band area (hereinafter also referred to as the resume band area) corresponding to the management band area is interrupted after interrupting the write processing in the particular write target track of the particular management band area at the particular position and writing the particular track of another non-management band area, the positioning error management unit 62 re-reads the positioning error before the resume position of the resume track. Note that even when the management band area (hereinafter also referred to as the current management band area) to which data is currently written by the interruption of power or the like becomes the non-management band area excluded from the management by the management table, the positioning error management unit 62 links the DOL target error corresponding to the management band area excluded from the management, while power is supplied from the PLP power supplied, to the management band area excluded from the management, and performs writing to the particular recording area, for example, the nonvolatile recording area.

The DOL management unit 63 manages the DOL. For example, when the write processing is resumed from the particular circumferential position (resume position) at which the write processing has been interrupted in the write target track (resume track) of the particular non-management band area, the DOL management unit 63 acquires, from the particular recording area, a DOL target error (hereinafter referred to as a resume band error) corresponding to the non-management band area (resume band area) in which the write processing is resumed, and calculates the DOL corresponding to the resume track based on the resume band error. In other words, when the management number is assigned to the non-management band area by resuming the write processing from the resume position of the resume track of the particular non-management band area and the management is performed as the management band area by the management table, the DOL management unit 63 acquires the resume band error from the particular recording area, calculate the DOL corresponding to this resume track based on the resume band error, and sets the calculated DOL as the DOL of the resume track. For example, when the write processing is resumed from the resume position of the resume track, the DOL management unit 63 acquires the resume band error from the particular recording area, and determines whether the resume band error is equal to or smaller than a threshold value (hereinafter referred to as an offset threshold value), or is larger than the offset threshold value. The offset threshold value corresponds to, for example, the positioning error in which the interval (read track width) between the previous track and the current track is within an allowable range. In other words, the offset threshold value corresponds to the positioning error of the current track, which is the number of times the number of retries of the write processing can be allowed when data is written to the next track. When the resume band error is equal to or smaller than the offset threshold value, the DOL management unit 63 calculates an actual DOL corresponding to the resume track based on the resume band error, and sets the calculated actual DOL as the DOL of the resume track. When it is determined that the resume band error is larger than the threshold value, the DOL management unit 63 calculates a theoretical DOL corresponding to the resume track based on a theoretical maximum positioning error corresponding to the track before the resume track, and sets the calculated theoretical DOL as the DOL of the resume track. The theoretical DOL is, for example, the radial range smaller than the actual DOL. Note that, for example, when the write processing is started from the first circumferential position of the first track of the particular non-management band area, the DOL management unit 63 calculates the theoretical DOL corresponding to the first track based on the theoretical maximum positioning error corresponding to the first track, and sets the calculated theoretical DOL as the DOL of the resume track.

Figure 4:
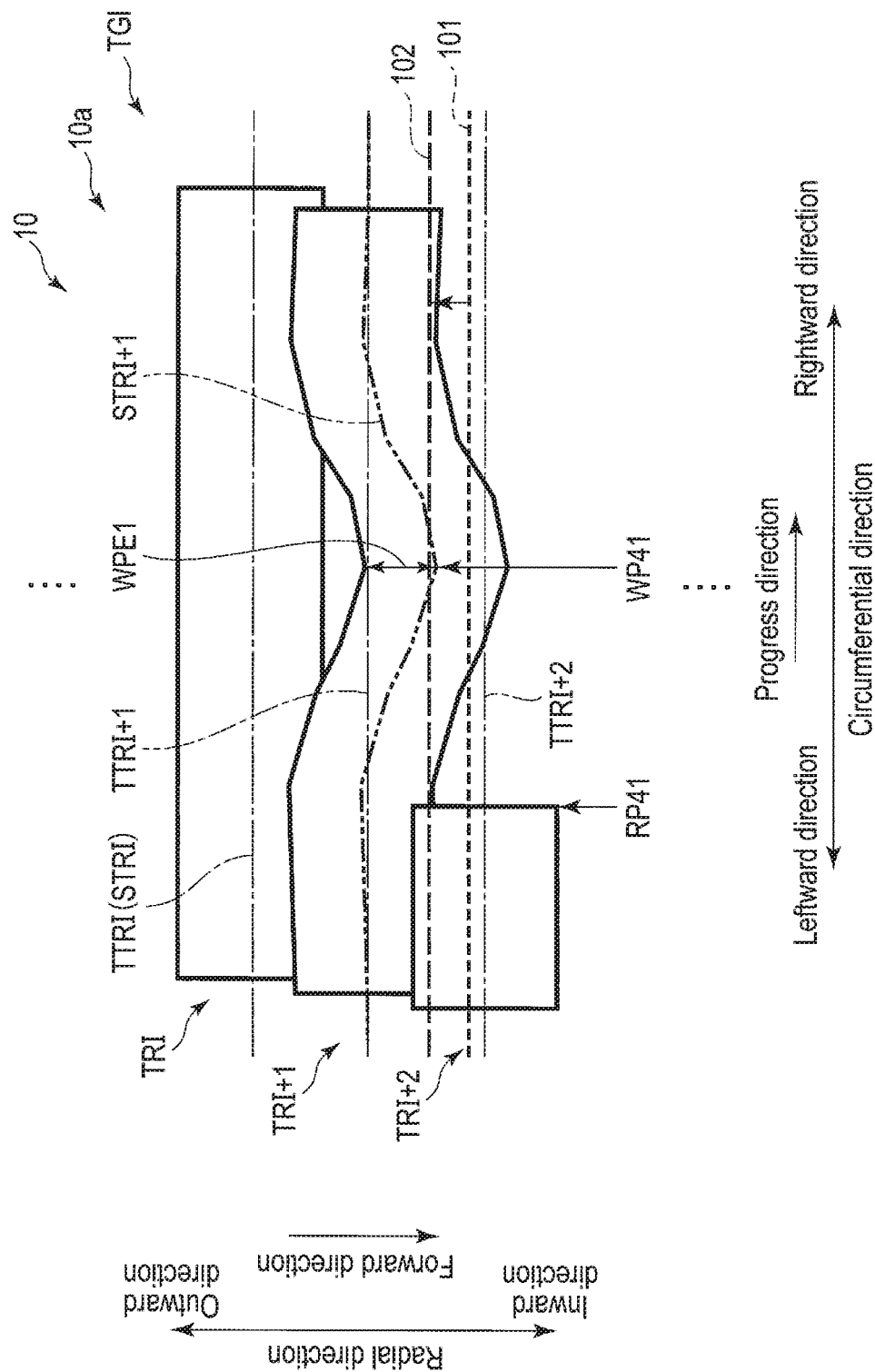
FIG. 4 is a diagram illustrating an example of DOL in a resume track according to the first embodiment.

FIG. 4 is a diagram illustrating an example of the DOL in the resume track according to the present embodiment. FIG. 4 illustrates the band area (non-management band area or resume band area) TG1 overwritten in the order of the tracks TR1, TR1+1, and TR1+2. The track TR1+2 corresponds to the resume track. FIG. 4 illustrates a target path TTR1 of the track TR1, an actual path STR1 of the track TR1, a target path TTR1+1 of the track TR1+1, an actual path STR1+1 of the track TR1+1, and a target path TTR1+2 of the track TR1+2. In FIG. 4, the target path TTR1 of the track TR1 and the actual path STR1 of the track TR1 are the same. FIG. 4 illustrates a resume position RP41 and a circumferential position WP41. FIG. 4 illustrates a resume band error (DOL target error) WPE1 corresponding to the circumferential position WP41. FIG. 4 illustrates a theoretical DOL 101 of the resume track TR1+2 calculated based on the theoretical maximum positioning error corresponding to the track TR1+1 before the resume track TR1+2 of the resume band area TG1, and an actual DOL 102 of the resume track TR1+2 calculated based on the resume band error WPE1.

In the example illustrated in FIG. 4, when the data write processing is resumed from the resume position RP41 of the resume track TR1+2 of the resume band area TG1, the DOL management unit 63 acquires the resume band error WPE1 from the nonvolatile recording area, for example, the system area 10*b* or the nonvolatile memory 90, and determines whether the acquired resume band error WPE1 is equal to or smaller than the offset threshold value, or is larger than the offset threshold value. When it is determined that the resume band error is equal to or smaller than the offset threshold value, the DOL management unit 63 calculates the actual DOL 102 based on the resume band error WPE1, and sets the calculated actual DOL 102 as the DOL of the resume track TR1+2. In other words, when it is determined that the resume band error is equal to or smaller than the offset threshold value, the DOL management unit 63 acquires the resume band error from the nonvolatile recording area, for example, the system area 10*b* or the nonvolatile memory 90, performs correction from the theoretical DOL 101 to the actual DOL 102 based on the acquired resume band error WPE1, and sets the calculated actual DOL 102 as the DOL of the resume track TR1+2. When the actual DOL 102 is set to the DOL and the writing of data is resumed from the resume position RP41 of the resume track TR1+2, the read/write controller 61 performs the write processing with the actual DOL 102. When it is determined that the resume band error is larger than the offset threshold value, the DOL management unit 63 calculates the theoretical DOL 101 corresponding to the resume track TR1+2 based on the theoretical maximum positioning error corresponding to the track TR1+1, and sets the calculated theoretical DOL 101 as the DOL of the resume track TR1+2. When the theoretical DOL101 is set to the DOL and the writing of data is resumed from the resume position RP41 of the resume track TR1+2, the read/write controller 61 performs the write processing with the theoretical DOL 101. In the case in which the write processing is performed with the actual DOL, the actual DOL is larger than the theoretical DOL, as compared with the case in which the write processing is performed with the theoretical DOL, the number of write retries that occur due to the interruption of the write processing is reduced.

Figure 5:
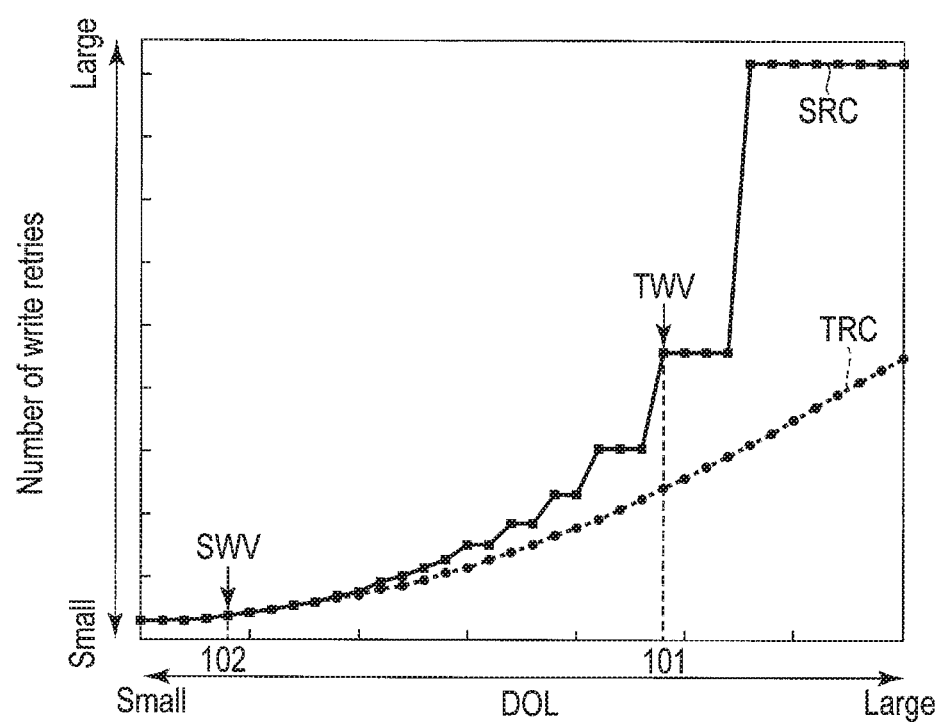
FIG. 5 is a diagram illustrating an example of a change in the number of write retries.

FIG. 5 is a diagram illustrating an example of a change in the number of write retries. In FIG. 5, a vertical axis represents the number of write retries, and a horizontal axis represents the DOL. In the vertical axis of FIG. 5, the number of write retries increases with the direction of the large arrow and decreases with the direction of the small arrow. In the horizontal axis of FIG. 5, the DOL increases with the direction of the large arrow and decreases with the direction of the small arrow. FIG. 5 illustrates a change TRC in the theoretical number of write retries with respect to the DOL and a change SRC in the actual number of write retries with respect to the DOL. FIG. 5 illustrates the actual number of write retries TWV corresponding to the write processing performed by the theoretical DOL 101 illustrated in FIG. 4 and the actual number of write retries SWV corresponding to the write processing performed by the actual DOL 102 illustrated in FIG. 4.

In the example illustrated in FIG. 5, the actual number of write retries SWV is smaller than the actual number of write retries TWV. Therefore, the number of write retries can be more reduced by performing the write processing with the actual DOL 102 than by performing the write processing with the theoretical DOL 101.

Figure 6:
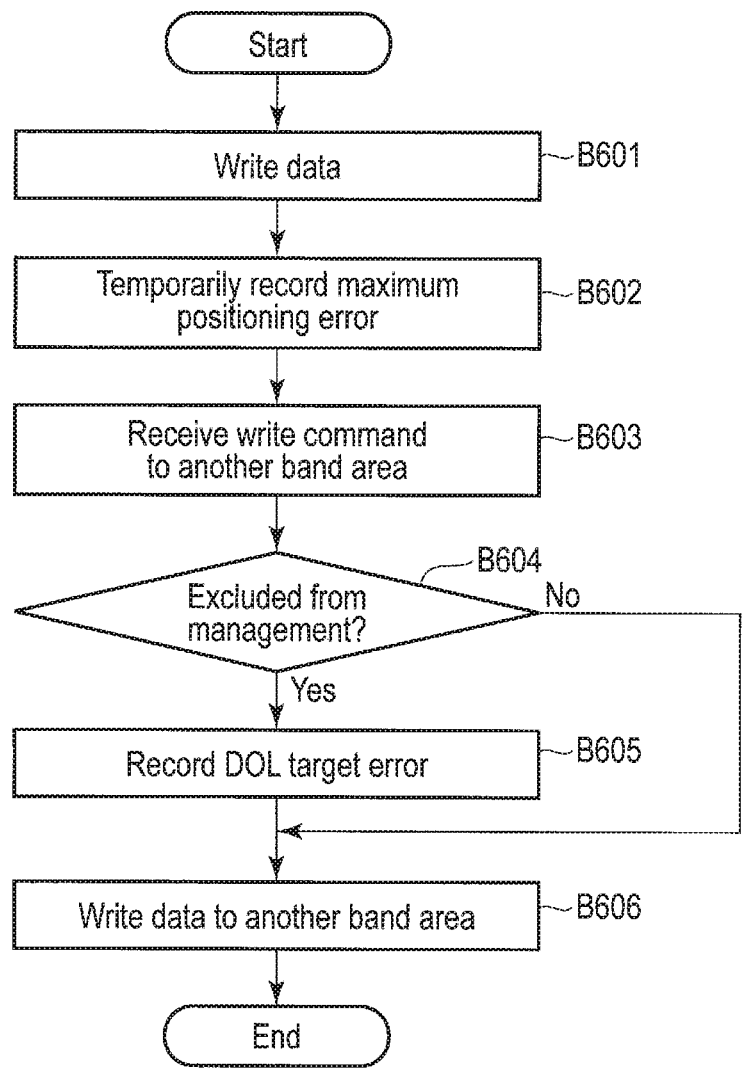
FIG. 6 is a flowchart illustrating an example of a method for recording a maximum positioning error of a particular band area according to the first embodiment.

FIG. 6 is a flowchart illustrating an example of a method for recording a maximum positioning error of a particular band area according to the present embodiment.

The MPU 60 writes data in a particular track of a particular management band area (B601), and temporarily records a maximum positioning error corresponding to the particular track (B602). For example, the MPU 60 writes the data to the particular track of the particular management band area, and temporarily records the maximum positioning error of the track in the particular recording area, for example, the volatile memory 70 or buffer memory 80. The MPU 60 receives, from the host 100 or the like, a write command instructing to write data to another band area different from the particular management band area, for example, a non-management band area (B603). The MPU 60 determines whether the particular management band area is excluded from management by the management table (B604). When it is determined that the particular management band area is not excluded from the management by the management table (No in B604), the MPU 60 proceeds to the processing of B606. When it is determined to the particular management band area is excluded from the management by the management table (Yes in B604), the MPU 60 records the DOL target error of the particular management band area in a particular recording area, for example, the system area 10b or the nonvolatile memory 90 (B605). The MPU 60 writes data to another band area (B606), and ends the processing.

FIG. 7 is a flowchart illustrating an example of the write processing method according to the present embodiment.

The MPU 60 receives a write command instructing to resume writing from the resume position of the resume track in the resume band area (B701). The MPU 60 acquires the resume band error corresponding to the resume band from the particular recording area, for example, the system area 10b or the nonvolatile memory 90 (B702). The MPU 60 determines whether the resume band error is equal to or smaller than the offset threshold value, or whether the resume band error is larger than the offset threshold value (B703). When it is determined that the resume band error is equal to or smaller than the offset threshold value (Yes in B703), the MPU 60 sets the actual DOL as the DOL of the resume track of the resume band area (B704), and proceeds to the processing of B705. When it is determined that the resume band error is larger than the offset threshold value (No in B703), the MPU 60 sets the theoretical DOL as the DOL corresponding to the resume track of the resume band area (B705). The MPU 60 starts data write processing from the resume position of the resume track in the resume band area (B706), and ends the processing.

According to the present embodiment, the magnetic disk device 1 writes data to the particular track of the particular management band area, and temporarily records the maximum positioning error corresponding to the particular track in the particular recording area, such as the volatile memory 70 or the buffer memory 80. When the particular management band area is excluded from the management by the management table and becomes the non-management band area, the magnetic disk device 1 records the DOL target error corresponding to the management band area excluded from the management by the management table in the particular recording area, for example, the system area 10b or the nonvolatile memory 90. When the writing is resumed from the resume position of the resume track of the resume band area, the magnetic disk device 1 acquires the resume band error corresponding to the resume band from the particular recording area, for example, the system area 10b or the nonvolatile memory 90. When the resume band error is equal to or smaller than the offset threshold value, the magnetic disk device 1 calculates the actual DOL based on the resume band error, and sets the calculated actual DOL as the DOL corresponding to the resume track. By resuming the write processing from the resume position of the resume track according to the actual DOL, the magnetic disk device 1 can prevent narrowing of the track pitch between the previous track and the current track and can reduce the number of write retries. Therefore, the magnetic disk device 1 can improve the write processing performance.

Next, magnetic disk devices according to other embodiments and modifications will be described. In other embodiments and modifications, the same reference numerals are assigned to the same parts as those of the above-described embodiment, and the detailed description thereof will be omitted.

Second Embodiment

The magnetic disk device 1 of the second embodiment differs from the magnetic disk device 1 of the first embodiment in terms of the configuration that performs the write processing.

FIG. 8 is a block diagram illustrating a configuration of a magnetic disk device 1 according to the second embodiment.

The MPU 60 includes the read/write controller 61, the positioning error management unit 62, the DOL management unit 63, and a target path management unit 64. The MPU 60 performs the processing of these units, such as the read/write controller 61, the positioning error management unit 62, the DOL management unit 63, and the target path management unit 64, on firmware. Note that the MPU 60 may include these units, for example, the read/write controller 61, the positioning error management unit 62, the DOL management unit 63, and the target path management unit 64 as circuits.

The target path management unit 64 manages the target path of each track in the particular band area. For example, when the writing is resumed from the resume position of the resume track of the resume band area, the target path management unit 64 acquires the resume band error from the particular recording area, for example, the system area 10*b* or the nonvolatile memory 90, and changes a target path corresponding to the resume track of the resume band area (hereinafter referred to as a resume track target path) based on the resume band error. In other words, when the management number is assigned to the resume band area (non-management band area) by resuming the write processing from the resume position of the resume track of the resume band area and the management is performed by the management table as the management band area, the target path management unit 64 acquires the resume band error from the particular recording area, and changes the resume track target path based on the resume band error. For example, when the writing is performed from the resume position of the resume track of the resume band area, the target path management unit 64 acquires the resume band error from the particular recording area, and determines whether the resume band error is larger than the offset threshold value, or is equal to or smaller than the offset threshold value. When it is determined that the resume band error is larger than the threshold value, the target path management unit 64 changes the resume track target path to a shifted target path (hereinafter referred to as a change path) in the forward direction by a shift amount (hereinafter referred to as an expansion amount) corresponding to a difference value between the resume band error and the offset threshold value. When it is determined that the resume band error is equal to or smaller than the offset threshold value, the target path management unit 64 maintains, for example, the resume track target path.

Figure 9:
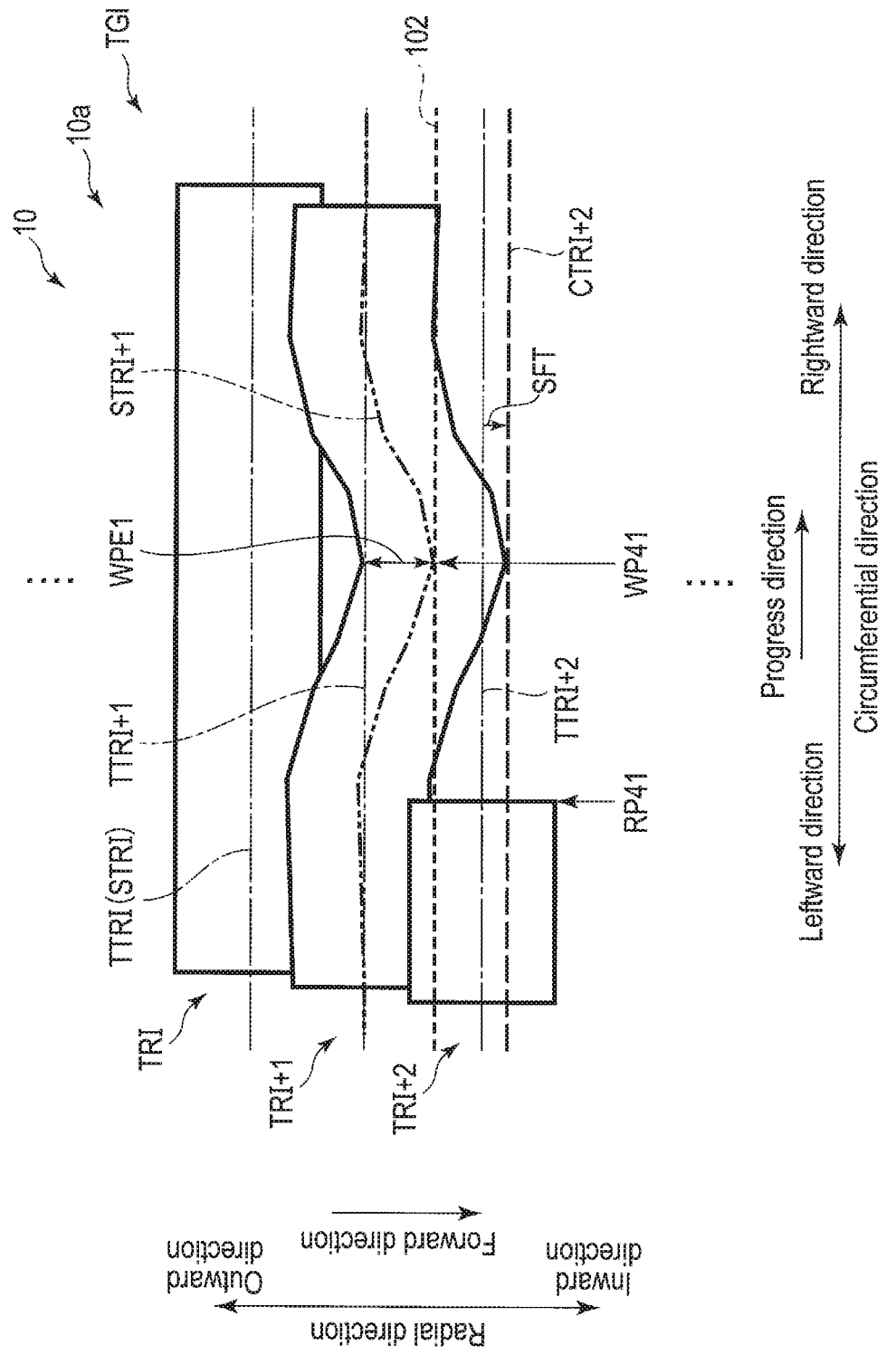
FIG. 9 is a diagram illustrating an example of a change path according to the second embodiment.

FIG. 9 is a diagram illustrating an example of the change path CTR1+2 according to the second embodiment. FIG. 9 illustrates the target path TTR1+2 of the track TR1+2, the change path CTR1+2 of the track TR1+2, and the actual DOL 102. The target path TTR1+2 of the track TR1+2 corresponds to the resume track target path. FIG. 9 illustrates the expansion amount SFT of the change path CTR1+2 with respect to the target path TTR1+2.

In the example illustrated in FIG. 9, when the write processing is resumed from the resume position RP41 of the resume track TR1+2 of the particular non-management band area TG1, the target path management unit 64 acquires the resume band error WPE1 from the particular recording area, and determines whether the resume band error WPE1 is larger than the offset threshold value, or is smaller than the offset threshold value. When it is determined that resume band error WPE1 is larger than the offset threshold value, the target path management unit 64 calculates the expansion amount SFT from the difference between the acquired resume band error WPE1 and the offset threshold value, and sets the change path CTR1+2, in which the resume track target path TTR1+2 is shifted in the forward direction by the calculated expansion amount SFT, as the target path of the resume track TR1+2. When the writing of data is resumed from the resume position RP41 of the resume track TR1+2, the read/write controller 61 performs the write processing along the change path CTR1+2 with the actual DOL 102. When it is determined that the resume band error WPE1 is equal to or smaller than the offset threshold value, the target path management unit 64 sets the resume track target path TTR1+2 as the target path of the resume track TR1+2. When the writing of data is resumed from the resume position RP41 of the resume track TR1+2, the read/write controller 61 performs the write processing along the resume track target path TTR1+2 with the actual DOL 102. When the write processing is performed along the change path CTR1+2, the change path CTR1+2 is more separated in the forward direction from the actual path STR1+1 of the track TR1+1 than the resume track target path TTR1+2, as compared with the case of performing the write processing along the resume track target path TTR1+2. Therefore, it is possible to reduce the number of write retries that occur due to the interruption of the write processing.

FIG. 10 is a flowchart illustrating an example of the write processing method according to the second embodiment.

The MPU 60 receives a write command instructing to resume writing from the resume position of the resume track of the resume band area (B701), acquires the resume band error corresponding to the resume band from the particular recording area, for example, the system area 10*b* or the nonvolatile memory 90 (B702), and determines whether the resume band error is equal to or smaller than the offset threshold value, or whether the resume band error is larger than the offset threshold value (B703). When it is determined that the resume band error is equal to or smaller than the offset threshold value (Yes in B703), the MPU 60 proceeds to the processing of B704. When it is determined that the resume band error is larger than the offset threshold value (No in B703), the MPU 60 changes the resume track target path to the change path based on the expansion amount calculated from the difference between the resume band error and the offset threshold value (B1001), and sets the actual DOL as the DOL of the resume track of the resume band area (B704). For example, the MPU 60 calculates the expansion amount from the difference between the resume band error and the offset threshold value, and the MPU 60 starts data write processing from the resume position of the resume track of the resume band area (B706), and ends the processing.

According to the second embodiment, when the resume band error is larger than the threshold value, the magnetic disk device 1 changes the resume track target path to the change path based on the expansion amount calculated from the difference between the resume band error and the offset threshold value, and sets the change path as the target path of the resume track. The magnetic disk device 1 resumes the write processing from the resume position of the resume track along the change path. By resuming the write processing along the change path, the magnetic disk device 1 can prevent narrowing of the track pitch between the previous track and the current track and can reduce the number of write retries. Therefore, the magnetic disk device 1 can improve the write processing performance.

(Modification 1)

The magnetic disk device 1 of the first modification differs from the magnetic disk device 1 of the second embodiment in that the expansion amount is corrected by shifting the target path.

When the writing is performed in the particular band area different from the resume band area after the resume track of the resume band area is written by the change path, the target path management unit 64 has difficulty in recording the deviation (hereinafter referred to as the target path deviation) in the particular recording area, for example, the system area 10*b* and the nonvolatile memory 90, corresponds to the expansion amount in the forward direction of the target path of at least one track after the next track to be overwritten on the resume track of the resume band area. Therefore, when writing the resume track along the change path which has shifted the resume track target path in the forward direction by the expansion amount in the resume band area, the target path management unit 64 eliminates the target path deviation by shifting the target path of at least one track after the next track to be overwritten on the resume track in the direction opposite to the forward direction. For example, when the next track is overwritten on the resume track written along the change path obtained by shifting the resume track target path in the forward direction by the expansion amount, the target path management unit 64 determines whether the DOL target error corresponding to the next track is equal to or smaller than the offset threshold value, or is larger than the offset threshold value. When it is determined that the DOL target error is equal to or smaller than the offset threshold value, the target path management unit 64 calculates a distance (hereinafter referred to as a correction amount) to shift the target path of the next track to be overwritten on the resume track in the forward direction and the reverse direction based on the DOL target error and the offset threshold value, and sets, as the target path of the next track, a target path (hereinafter also referred to as a correction path), in which the target track of the next track to be overwritten on the resume track has been deviated (corrected) in the direction opposite to the forward direction according to the calculated correction amount. The target path management unit 64 repeats the processing until the target path deviation is eliminated in the write processing of at least one track subsequent to the next track to be overwritten on the resume track.

Figure 11:
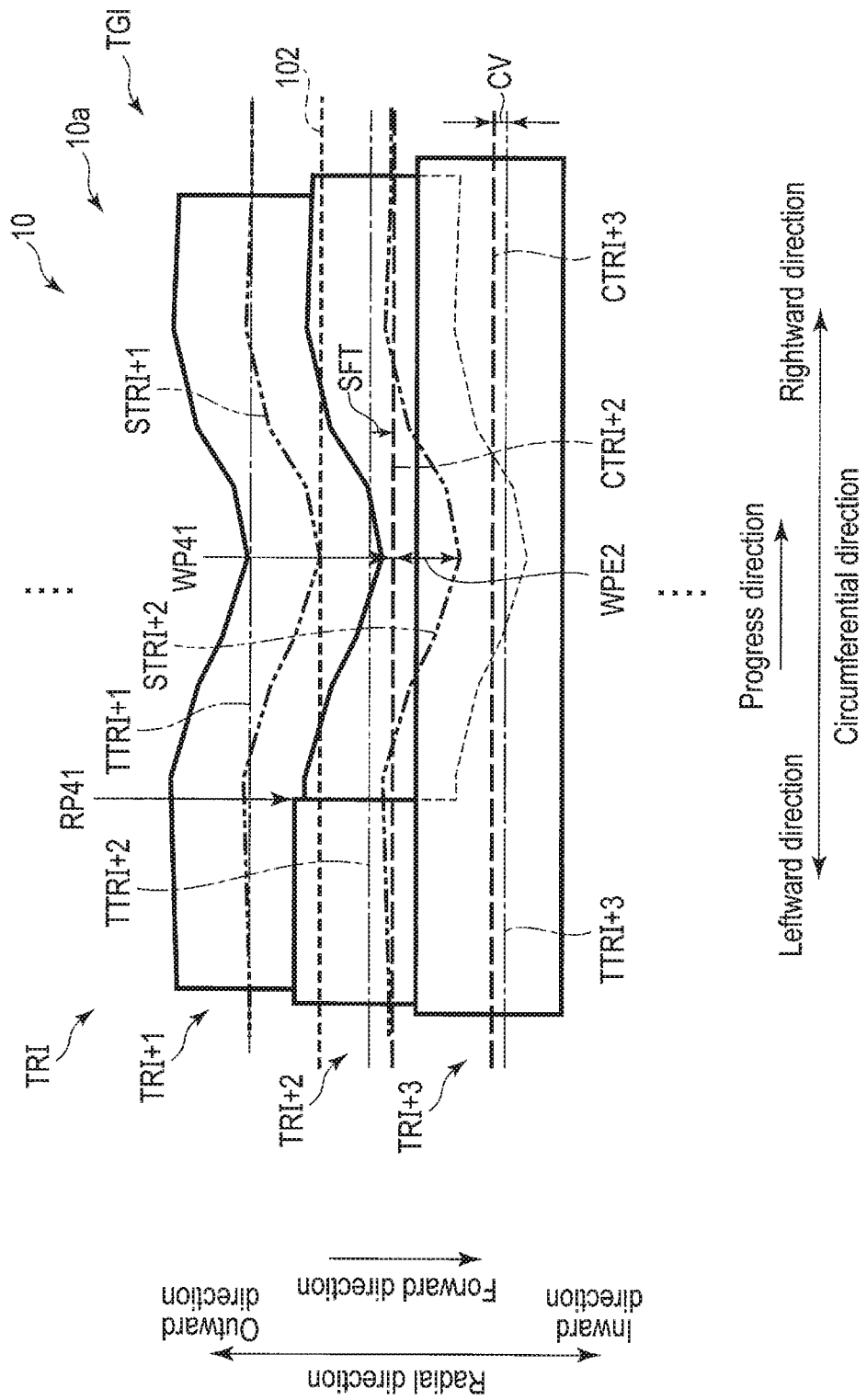
FIG. 11 is a diagram illustrating an example of a method for correcting a target path according to modification 1.

FIG. 11 is a diagram illustrating an example of a method for correcting a target path according to modification 1. FIG. 11 illustrates the band area TG1 overwritten in the order of the tracks TR1+1, TR1+2, and TR1+3. The track TR1+2 corresponds to the resume track. FIG. 11 illustrates the target path TTR1+3 of the track TR1+3 and the correction path CTR1+3 deviated in the direction opposite to the forward direction so as to correct the expansion amount SFT of the change path CTR1+2. The target path TTR1+3 is, for example, radially spaced from the change path CTR1+2 at the same interval as the target path TTR1+1 and the target path TTR1+2. FIG. 11 illustrates the correction amount CV of the correction path CTR1+3 with respect to the target path TTR1+3.

In the example illustrated in FIG. 11, in the case in which the next track TR1+3 is overwritten on the resume track TR1+2 after the resume track TR1+2 is written by changing to the resume track target path TTR1+2 in which the change path CTR1+2 is shifted in the forward direction by the expansion amount SFT, the target path management unit 64 determines whether the DOL target error WPE2 corresponding to the next track TR1+3 is equal to or smaller than the offset threshold value, or is larger than the offset threshold value. When it is determined that the DOL target error WPE2 is equal to or smaller than the offset threshold value, the target path management unit 64 calculates the correction amount CV corresponding to the difference between the offset threshold value and the DOL target error WPE2, and sets, as the target path of the next track TR1+3, the correction path CTR1+3 in which the target path TTR1+3 of the next track TR1+3 is deviated in the direction opposite to the forward direction. When the next track TR1+3 is overwritten on the resume track TR1+2, the read/write controller 61 performs the write processing along the correction path CTR1+3. When it is determined that the DOL target error WPE2 is larger than the offset threshold value, the target path management unit 64 sets the target path TTR1+3 of the next track TR1+3 as the target path of the next track TR1+3 with the correction amount=0. When the next track TR1+3 is overwritten on the resume track TR1+2, the read/write controller 61 performs the write processing along the target path TTR1+3. In addition, even in the tracks subsequent to the track to be overwritten on the next track TR1+3, the target path management unit 64 repeats the same processing as in the case of writing the track TR1+3 until the expansion amount SFT deviated in the forward direction is eliminated when the resume track is written along the change path CTR1+2 for each track overwritten after the next track TR1+3.

Figure 12:
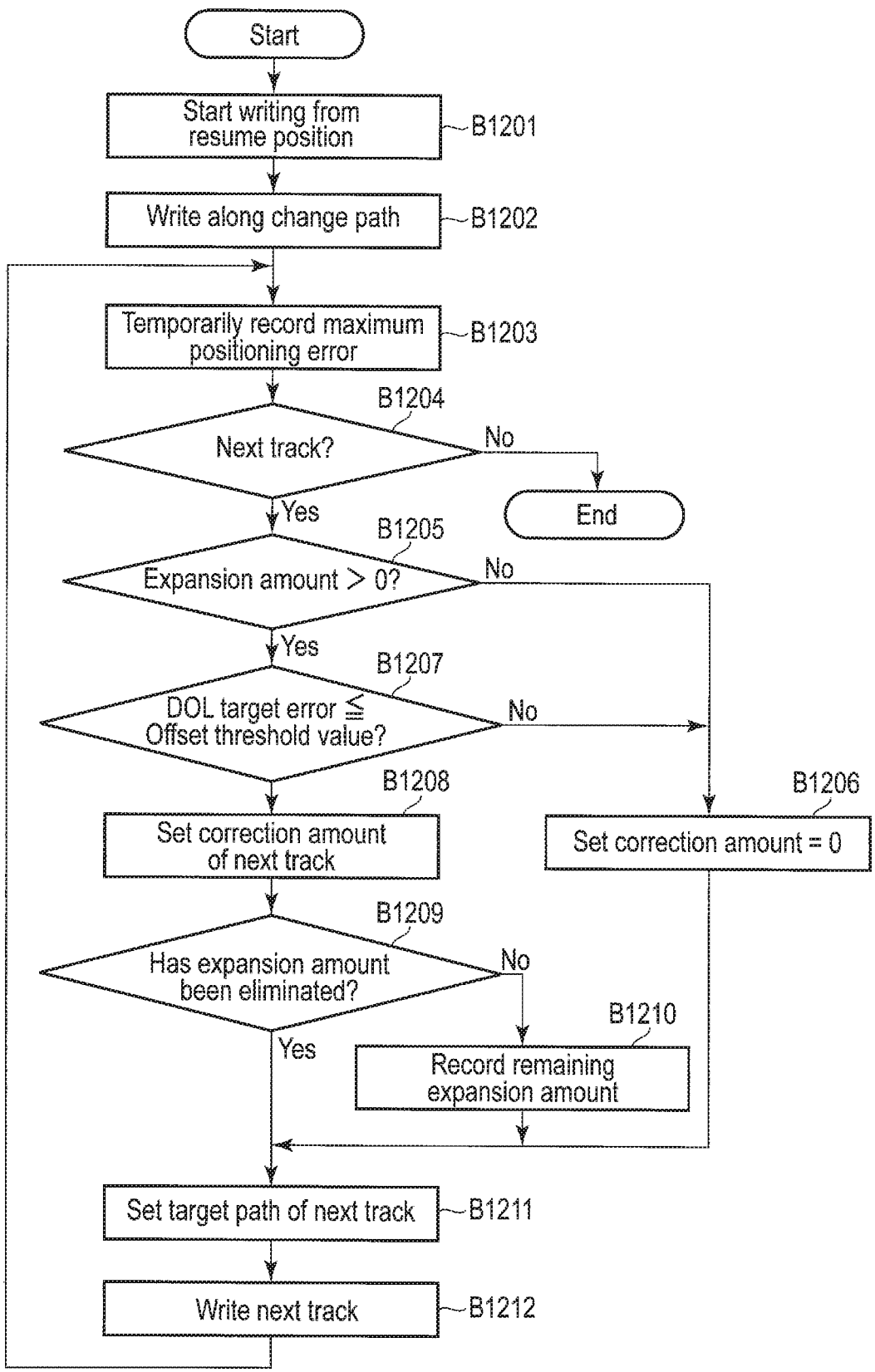
FIG. 12 is a flowchart illustrating an example of a write processing method according to modification 1.

FIG. 12 is a flowchart illustrating an example of a write processing according to modification 1.

The MPU 60 starts writing from the resume position of the resume track (B1201), writes the resume track along the change path (B1202), and temporarily records the maximum positioning error corresponding to the resume track (B1203). The MPU 60 determines whether there is the particular track, for example, the next track of the resume track (B1204). When it is determined that there is no next track (No in B1204), the MPU 60 ends the processing. When it is determined that there is the next track (Yes in B1204), the MPU 60 determines whether the expansion amount of the change path with respect to the resume track target path when writing the resume track is larger than 0, or determines whether the expansion amount is 0 (B1205). In other words, the MPU 60 determines whether the resume track is written along the resume track target path or whether the resume track target path is written by the change path shifted by the expansion amount. When it is determined that the expansion amount is 0 (No in B1205), the MPU 60 sets the correction amount=0 (B1206), and proceeds to the processing of B1211. When it is determined that the expansion amount is larger than 0 (Yes in B1205), the MPU 60 determines whether the DOL target error is equal to or smaller than the offset threshold value or whether the DOL target error is larger than the offset threshold value (B1207). When it is determined that the DOL target error is larger than the offset threshold value (No in B1207), the MPU 60 proceeds to the processing of B1206. When it is determined that the DOL target error is equal to or smaller than the offset threshold value (Yes in B1207), the MPU 60 sets the correction amount of the next track (B1208). For example, the MPU 60 sets the difference value between the offset threshold value and the DOL target error as the correction amount of the next track. When the resume track is written, the MPU 60 determines whether the expansion amount obtained by shifting the resume track target path in the forward direction has been eliminated (B1209). When it is determined that the expansion amount has not been eliminated (No in B1209), the MPU 60 records the remaining expansion amount (B1210), and proceeds to the processing of B1211. When it is determined that the expansion amount has been eliminated (Yes in B1209), the MPU 60 sets the target path of the next track based on the correction amount (B1211). For example, the MPU 60 sets the correction path obtained by shifting the target path of the next track by the correction amount in the direction opposite to the forward direction as the target path of the next track. The MPU 60 writes the next track along the target path (B1212), and proceeds to the processing of B1203. For example, the MPU 60 writes the next track along the correction path set in B1211, and proceeds to the processing of B1203.

According to the first modification, when the resume track is written along the change path that has shifted the resume track target path in the forward direction by the expansion amount, the magnetic disk device 1 eliminates the deviation corresponding to the expansion amount in the forward direction occurring in each track after the next track to be overwritten on the resume track of the band area by deviating and overwriting the target path of at least one track after the next track to be overwritten on the resume track in the direction opposite to the forward direction in the particular management band area. Therefore, even when the resume band area is excluded from the management by the management table and becomes the non-management band area by eliminating the target path deviation and then the resume band area is managed again as the management band area by the management table, the target path management unit 64 can change the resume track target path to the change path based on the resume band error and the offset threshold value as described above, and can resume the write processing along the change path. Therefore, the magnetic disk device 1 can improve the write processing performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head that writes data to the disk and reads data from the disk; and
a controller that overwrites a second track on a first track in a first track group, and records a first positioning error which is a maximum positioning error in a first direction from the first track to the second track, of a plurality of positioning errors of the head to a plurality of target positions of the head in a radial direction intersecting a circumferential direction corresponding to a plurality of circumferential positions in the circumferential direction of the disk of the first track, to a first recording area which is a nonvolatile recording area,
wherein
the controller records the first positioning error in the first recording area when data is written in a second track group different from the first track group, and sets a first range in which the write processing is prohibited in a second direction opposite to the first direction, based on the first positioning error when the write processing of the second track is interrupted at a first position in a circumferential direction of the disk and the write processing is resumed from the first position after the write processing is performed on the second track group.

2. The magnetic disk device according to claim 1, wherein in a case of excluding the first track group from a management table that manages a band area for performing write processing when data is written to the second track group different from the first track group, the controller records the first positioning error in the first recording area.

3. The magnetic disk device according to claim 1, wherein, when it is determined that the first positioning error is equal to or smaller than a first threshold value corresponding to the number of retries of write processing, which is allowable by the first positioning error, the controller sets the first range based on the first positioning error.

4. The magnetic disk device according to claim 1, wherein, when the write processing of the second track is interrupted at a first position in a circumferential direction of the disk and the remaining third track of the second track is written from the first position after the write processing is performed on the second track group, the controller deviates a target first path of the head in the first direction when the third track is written.

5. The magnetic disk device according to claim 4, wherein the controller deviates the first path in the first direction based on the first positioning error.

6. The magnetic disk device according to claim 4, wherein, when it is determined that the first positioning error is larger than a first threshold value corresponding to the number of retries of the write processing, which is allowable by the first positioning error, the controller changes the first path to a second path deviated in the first direction by a difference value between the first positioning error and the first threshold value.

7. The magnetic disk device according to claim 4, wherein, when a fourth track is overwritten in the first direction of the second track, the controller deviates the fourth track in a second direction opposite to the first direction.

8. The magnetic disk device according to claim 1, wherein the disk has the first recording area.

9. A write processing method applied to a magnetic disk device including a disk and a head that writes data to the disk and reads data from the disk, the write processing method comprising:
overwriting a second track on a first track in a first track group;
recording a first positioning error which is a maximum positioning error in a first direction from the first track to the second track, of a plurality of positioning errors of the head to a plurality of target positions of the head in a radial direction intersecting a circumferential direction corresponding to a plurality of circumferential positions in the circumferential direction of the disk of the first track, to a first recording area which is a nonvolatile recording area;
recording the first positioning error in the first recording area when data is written in a second track group different from the first track group, and
when the write processing of the second track is interrupted at a first position in a circumferential direction of the disk and the write processing is resumed from the first position after the write processing is performed on the second track group, setting a first range in which the write processing is prohibited in a second direction opposite to the first direction, based on the first positioning error.

10. The write processing method according to claim 9, further comprising:
in a case of excluding the first track group from a management table that manages a band area for performing write processing when data is written to the second track group different from the first track group, recording the first positioning error in the first recording area.

11. The write processing method according to claim 9, further comprising:
when it is determined that the first positioning error is equal to or smaller than a first threshold value corresponding to the number of retries of write processing, which is allowable by the first positioning error, setting the first range based on the first positioning error.

12. The write processing method according to claim 9, further comprising:
   when the write processing of the second track is interrupted at a first position in a circumferential direction of the disk and the remaining third track of the second track is written from the first position after the write processing is performed on the second track group, deviating a target first path of the head in the first direction when the third track is written.

13. The write processing method according to claim 12, further comprising:
   deviating the first path in the first direction based on the first positioning error.

14. The write processing method according to claim 12, further comprising:
   when it is determined that the first positioning error is larger than a first threshold value corresponding to the number of retries of the write processing, which is allowable by the first positioning error, changing the first path to a second path deviated in the first direction by a difference value between the first positioning error and the first threshold value.

15. The write processing method according to claim 12, further comprising:
   when a fourth track is overwritten in the first direction of the second track, deviating the fourth track in a second direction opposite to the first direction.

16. The write processing method according to claim 9, wherein the disk has the first recording area.

\* \* \* \* \*